United States Patent [19]

Buquet

[11] Patent Number: 5,351,520

[45] Date of Patent: Oct. 4, 1994

US005351520A

[54] FLUIDIZED POWDER FLOWRATE MEASUREMENT METHOD AND DEVICE

[75] Inventor: Thierry Buquet, Grenoble, France

[73] Assignee: Sames S.A., Meylan, France

[21] Appl. No.: 925,638

[22] Filed: Aug. 7, 1992

[30] Foreign Application Priority Data

Aug. 12, 1991 [FR] France ................. 91 10238

[51] Int. Cl.⁵ .......................... G01F 1/76; G01N 3/56
[52] U.S. Cl. ........................................ 73/7; 73/861.04
[58] Field of Search ............... 73/861.04, 86, 7, 198;
406/14, 30, 34

[56] References Cited

U.S. PATENT DOCUMENTS

| | | | |
|---|---|---|---|
| 2,439,723 | 4/1948 | Engdahl | 73/861.04 X |
| 4,480,947 | 11/1984 | Nagasaka | 406/14 |
| 4,941,778 | 7/1990 | Lehmann | 73/861.04 X |

FOREIGN PATENT DOCUMENTS

| | | |
|---|---|---|
| 0216574 | 4/1987 | European Pat. Off. . |
| 2925510 | 1/1981 | Fed. Rep. of Germany . |
| 0060015 | 4/1982 | Japan ................. 73/861.04 |
| 0077622 | 5/1983 | Japan ................. 73/861.04 |
| 2105854 | 3/1983 | United Kingdom . |

*Primary Examiner*—Herbert Goldstein

[57] ABSTRACT

The flowrate of powder in an air-powder mixture circuit comprising a mixture drive area defined by a powder drive device comprising air injector means adapted to inject air in the direction in which the mixture is to be driven is measured by measuring the pressure difference across the drive area and the injected air flowrate and computing the powder flowrate as a function of these two variables. The degree of wear of a venturi tube which forms the drive area is calculated by integrating with respect to time two parameters representing air-powder mixture flow rate and the air flow rate.

10 Claims, 2 Drawing Sheets

FLUIDIZED POWDER FLOWRATE MEASUREMENT METHOD AND DEVICE

BACKGROUND OF THE INVENTION

1. Field of the Invention

The invention concerns a method of measuring the flowrate of fluidized powder in a circuit including an air-powder mixture drive area into which air is injected.

The invention enables evaluation of the powder mass flowrate on the basis of measurements at selected points of a mixture drive device defining said drive area. It also enables flowrate regulation, reporting of absence of powder and determination of the degree of wear of an essential component of the drive device which is also part of the powder flowrate measuring means.

The invention also concerns a powder flowrate measuring device implementing the above method.

2. Description of the Prior Art

U.S. Pat. No. 4,480,947 describes a powder flowrate measuring device disposed between a fluidized powder storage tank and a powder conveyor device forming a sort of compressed air pump whose function is to impart to the air-powder mixture sufficient energy to enable it to be conveyed in a pipe to a station where it is used. The measurement principle employed is to inject air at a constant flowrate into a pipe section of predetermined length and cross-section and to measure the pressure drop across this pipe section. The only function of the air injected is to move the powder across the orifice at a predetermined speed. In other words, a head loss is generated only to measure the mass flowrate of powder. Generating this head loss disturbs the operation of the powder conveyor device further downstream. Also, the accuracy if the measurement is reduced over a period of time because of wear of the pipe section in which the head loss is produced. The degree of wear becomes unacceptable after a varying period of time dependent on the operating conditions. The device described comprises no means of evaluating this wear. Finally, the construction of the known system is highly complex because it requires a controlled flowrate compressed air supply and a dedicated arrangement for generating and measuring the head loss.

The invention proposes to use another type of measurement which is free of the drawbacks mentioned above and employs only a limited number of sensors in a particularly simple arrangement.

SUMMARY OF THE INVENTION

In one aspect, the present invention consists in a method of measuring the flowrate of powder in an air-powder mixture circuit comprising a mixture drive area defined by a powder drive device comprising air injector means adapted to inject air in the direction in which said mixture is to be driven, which method measures the pressure difference across said drive area, measures the injected air flowrate and computes said powder flowrate as a function of these two variables.

The flowrate of the injected air can of course be deduced from the pressure measured on the upstream side of the injector.

In other words, the invention consists in measuring the operating parameters of the powder drive device conventionally used in many installations including an air-powder mixture circuit. One such powder drive device comprises a throat usually called a "Venturi" and an air injector disposed axially at the throat entry and connected to a compressed air supply. The effect of the injected air is to give to the powder its momentum or impulse. The above two measurements amount to measuring momentum of the air and of the powder before mixing and after mixing, during passage through the throat. The powder mass flowrate is deduced from these two measurements. The throat is a tube of small diameter serving as the conveyor over the required pipe length and of sufficient length (5 to 15 times its diameter, for example) to achieve homogeneous mixing of air and powder. It preferably has a divergent outlet to minimize the head loss. It may comprise a convergent inlet. The powder is entrained by the air injected at high speed in the throat. Note that in this type of arrangement the powder mass flowrate is inversely proportional to the pressure difference across said drive area. On the other hand, in the prior art system described above the powder mass flowrate is virtually proportional to the head loss measured across the pipe section. The measurement may seem relatively simple but the equipment is in fact very complicated.

In a second aspect, the invention consists in a device for measuring the flowrate of powder in an air-powder mixture circuit comprising drive air injector means operative in a drive area of said circuit, pressure measuring means connected to either side of said drive area, air flowrate measuring means connected to said air injector means and computing means adapted to receive signals produced by said measuring means and to produce an information signal representative of the powder flowrate.

The injected air flowrate measuring means may comprise a pressure sensor connected to the inlet side of an injector.

In this way two sensors are sufficient for obtaining the data needed to evaluate the powder mass flowrate in the air-powder mixture crossing the drive area. The pressure measuring means comprise a differential pressure sensor connected to each side of the drive area and the air flowrate measuring means may comprise a pressure sensor adapted to deliver a signal representing the total head pressure of the injected air. The sensors may be of any known type, including piezoelectric or strain gauge sensors.

The invention will be better understood and its other advantages will emerge more clearly from the following description given by way of example only with reference to the appended drawings.

DETAILED DESCRIPTION OF THE INVENTION

Figure 1:
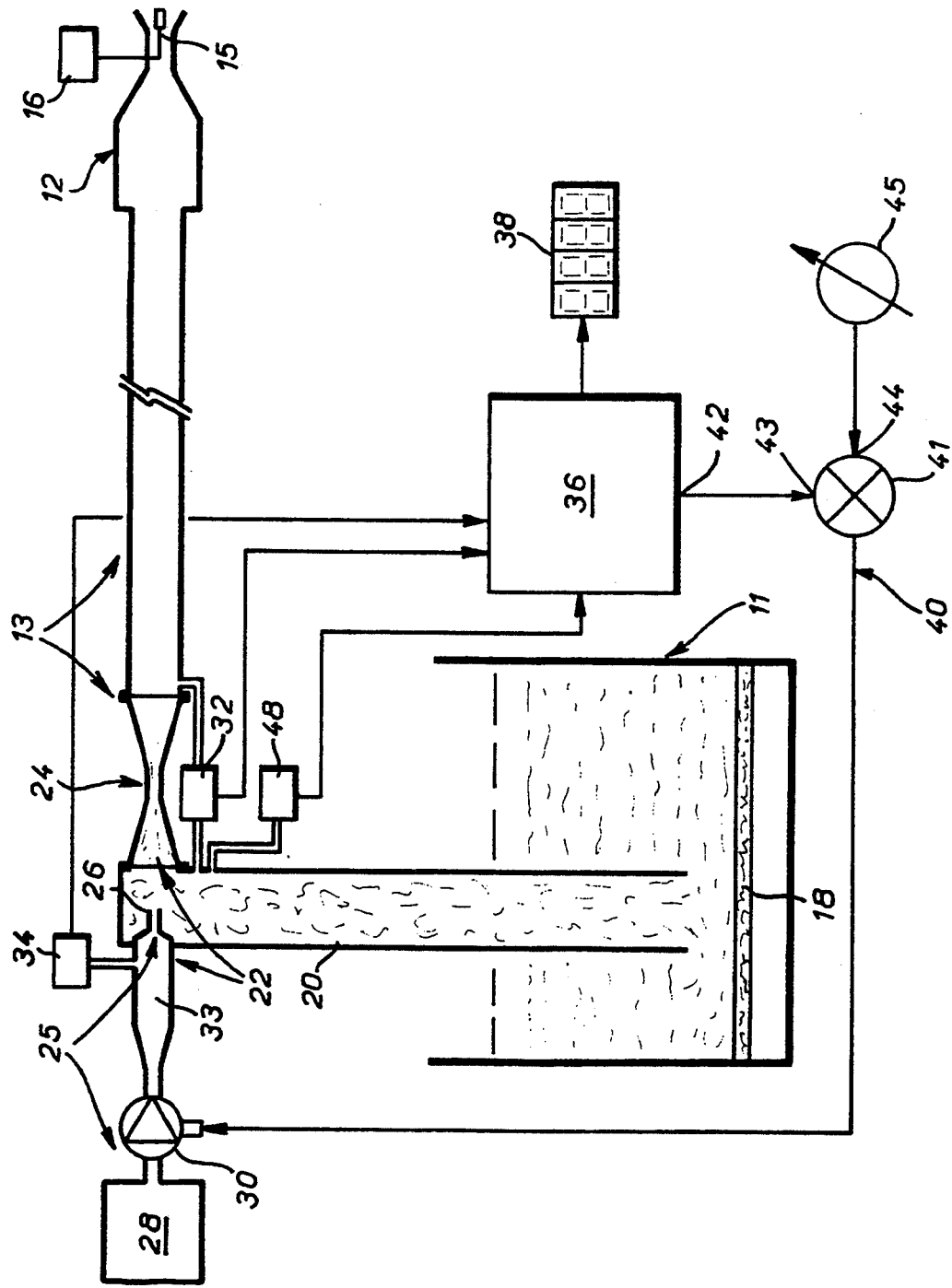
FIG. 1 is a schematic showing an installation for electrostatic spraying of thermofusible powder paint incorporating powder mass flowrate measuring means in accordance with the invention.

Referring to FIG. 1, an installation for electrostatic spraying of thermofusible powder paint comprises a powder storage tank 11, a powder paint sprayer 12 and an air-powder mixture circuit 13 extending from the tank 11 to the sprayer 12. The latter includes an electrode 15 connected to a high-tension voltage supply 16.

The storage tank 11 conventionally has a double bottom incorporating a porous wall 18 through which air is injected to fluidize the powder in the tank. The circuit 13 includes a suction tube 20 descending vertically into the tank. A powder drive device 22 known in itself is inserted into the circuit 13 at the top of the suction tube 20. It comprises a throat 24 usually called a "Venture" and air injector means 25 adapted to inject a high speed air jet into the throat 24 in the axial direction (i.e. in the required propagation direction for the air-powder mixture). The injector means comprise an injector nozzle 26 directed axially relative to the throat and a compressed air supply 28 feeding said injector through a valve 30. This arrangement creates a drive area which in this example extends substantially from the top of the pipe 20 to the outlet of the throat 24. The throat 24 is advantageously a removable part of the circuit 13 which can be replaced easily.

The flowrate measuring device includes at least two pressure measuring means 32, 34. In this example a first pressure measuring means comprises a differential pressure sensor 32 connected to either side of the drive area to measure directly the pressure difference Δp between its inlet and its outlet. A second pressure measuring means comprises a sensor 34 for measuring pressure relative to atmospheric pressure or gage pressure, connected to the air injector means 25 on the inlet side of the injector nozzle 26. In other words, it is connected to a pipe section 33 connecting the compressed air supply to the nozzle 26. The flow cross-section in the pipe section 33 is very large as compared with that of the injector nozzle 26. The speed at which the air flows at the point to which the sensor 34 is connected may be regarded as virtually zero. The sensor 34 therefore outputs a signal representing the total head pressure of the air expelled through the nozzle 26. Also, variations of atmospheric pressure can be neglected (or even corrected) and the sensor 34 therefore regarded as producing a signal representing the absolute total head pressure Pi of the drive air.

It has been found that the mass flowrate Dp of powder across the drive area and therefore the flowrate of the powder in the circuit 13 can be deduced from the measured values of Δp and Pi respectively supplied by the sensors 32 and 34.

To be more precise, it has been found that the flowrate Dp can be determined with sufficient accuracy from the following equation:

$$Dp = \frac{K_1[K_2 Pi - Pat]^2}{Pi[\Delta p + \Delta h]} - K_3 Pi$$

where $K_1$, $K_2$ and $K_3$ are positive constants and Pat represents the atmospheric pressure which is regarded as constant in the term including it. It has been found that the head loss Δh in the throat is dependent virtually only on the pressure Pi. As previously mentioned, this pressure is representative of the injected air flowrate.

Consequently, it is seen that the powder mass flowrate can be determined easily by a computer for which the input data is the signals produced by the two sensors 32 and 34. In the FIG. 1 installation a computer 36 is programmed to cyclical computation, continuously, of the powder flowrate from the signals produced by the sensors 32 and 34. This computer drives display means 38 indicating the instantaneous value of the flowrate. The computer 36 is also part of a powder flowrate regulator loop 40 controlling the valve 30. This is a proportional valve and its control input is connected to the output of a comparator 41. The computer 36 has a data output 42 supplying a signal representing the powder mass flowrate and used as an error signal applied to an input 43 of the comparator 41. The other input 44 of the comparator 41 is connected to the output of a set point generator 45 enabling the powder flowrate to be set to a chosen value.

Finally, the installation comprises another relative pressure sensor 48 connected on the input side of the throat 24, to be more precise to the upper part of the suction tube 20. This sensor measures the pressure at this point which varies significantly when the storage tank 11 no longer contains any powder. The computer 36 is programmed to detect this pressure variation so that an alarm system can be actuated or spraying halted.

It is clear from the above description that the installation shown in FIG. 1 enables not only continuous monitoring of the powder flowrate by means of the display device 30 but also keeping the flowrate at a predetermined constant value as the valve 30 is controlled by a regulator signal derived from the signals supplied by the sensors 32 and 34.

Figure 2:
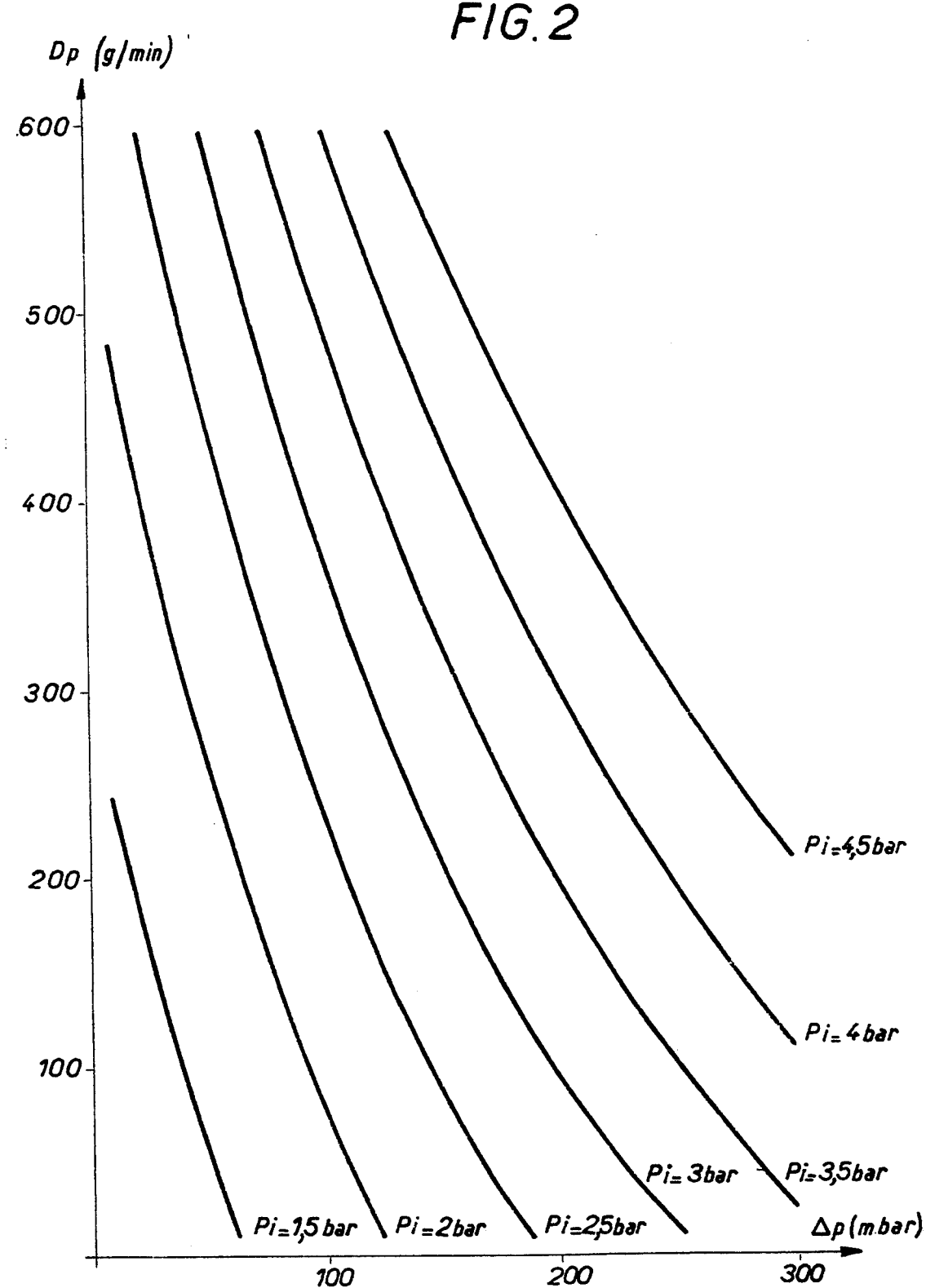
FIG. 2 is a graph showing the relationship between the powder flowrate and the variables measured in the powder flowrate measuring device incorporated in the installation from FIG. 1.

FIG. 2 is a calibration graph in which the powder flowrate Dp (in grams per minute) is plotted on the vertical axis as a function of the pressure difference Δp in millibar plotted on the horizontal axis. This calibration graph comprises a family of curves each representing a given injection pressure Pi, the variation of Pi from one curve to the next being 0.5 bar. How to "program" this calibration graph into the computer 6 will be obvious to the man skilled in the art.

According to another advantageous feature of the invention the computer 36 is also programmed to integrate with respect to time during any period in which the installation operates at least the two values measured by the sensors 32 and 34 or one of these values and the computed powder flowrate and to deduce therefrom an indication of the degree of wear of said throat as a function of these two integrated values. It is found that the wear of the throat 24 is a function of the kinetic energy of the air-powder mixture flowing through it. The density of the air-powder mixture is a function of the powder mass flowrate and the air flowrate while the air-powder mixture speed is a function of the drive air flowrate. Consequently, the degree of wear is a function of the powder flowrate and of the air flowrate. The air flowrate is deduced from the measured parameter Pi supplied by the sensor 34 . The powder flowrate is a function of this same parameter Pi and the pressure difference Δp measured by the sensor 32.

There is claimed:

1. A method of measuring the flow rate of a powder along an air-powder mixture path of a powder drive device, the device being composed of a Venturi tube having an inlet end and an outlet and forming a part of the mixture path and drive air injector means for injecting air into the Venturi tube to drive an air-powder mixture along the path and through the Venturi tube, said method comprising:

measuring the pressure difference between the inlet end and the outlet end of the Venturi tube;

measuring the flow rate at which air is injected into the Venturi tube;

computing the flow rate of powder along the mixture path as a function of the measured pressure difference and air flow rate; and calculating the degree of wear of the Venturi tube by integrating with respect to time two parameters representing the air-powder mixture flow rate and the air flow rate.

2. Method according to claim 1, wherein said parameters are the powder flow rate and the pressure difference between the inlet end and the outlet end of the Venturi tube.

3. A method according to claim 1, wherein:
the parameter representing the air-powder mixture flow rate is one of the measured pressure difference between the inlet end and the outlet end of the Venturi tube and the computed flow rate of powder along the mixture path; and the parameter representing the air flow rate is one of the flow rate at which air is injected by the drive air injector means and the pressure at which air is supplied to the drive air injector means.

4. A device for measuring the flow rate of a powder along an air-powder mixture path of a powder drive unit, the unit being composed of a Venturi tube having an inlet end and an outlet end and forming a part of the mixture path and drive air injector means for injecting air into the Venturi tube to drive an air-powder mixture along the path and through the Venturi tube, said device comprising:
pressure difference measuring means for measuring the pressure difference between the inlet end and the outlet end of the Venturi tube;
air flow rate measuring means for measuring the flow rate at which air is injected into the Venturi tube; and
computing means connected to said pressure difference measuring means and said air flow rate measuring means for computing the flow rate of powder along the mixture path as a function of the measured pressure difference and air flow rate, wherein said pressure difference measuring means comprise a differential pressure sensor connected to measure the pressure difference between the inlet end and the outlet end of said Venturi tube; and
said computing means are programmed to integrate with respect to time the two measured values measured by said pressure difference measuring means and said air flow rate measuring means or one of those values and the computed powder flow rate and to supply information representing the degree of wear of said Venturi tube as a function of the two integrated values.

5. Device according to claim 4, wherein said air flow rate measuring means comprise a pressure sensor adapted to supply a signal representing the total head pressure of the injected air.

6. Device according to claim 4 wherein said air injector means are adapted to inject air axially into said Venturi tube.

7. Device according to claim 6 wherein said powder drive unit is at the upper end of a pipe extending downwardly into a fluidized powder storage tank.

8. Device according to claim 4, wherein a valve is provided in said drive air injector means for regulating the powder flow rate and is controlled by a regulation signal derived from signals supplied by said pressure difference measuring means and said air flow rate measuring means.

9. Device according to claim 4, further comprising a pressure sensor connected on the inlet side of said drive unit to supply a signal representing the presence of powder in the unit.

10. Device according to claim 4, wherein said computing means are programmed to compute continuously the powder flow rate from signals supplied by said pressure difference measuring means and said air flow rate measuring means.

* * * * *